United States Patent [19]
Nihei et al.

[11] Patent Number: 5,484,982
[45] Date of Patent: Jan. 16, 1996

[54] BEAM AXIS ADJUSTING METHOD FOR A LASER ROBOT

[75] Inventors: Ryo Nihei, Fujiyoshida; Akihiro Terada, Yamanashi; Hiroshi Takamatsu, Anan, all of Japan

[73] Assignee: Fanuc Ltd., Yamanashi, Japan

[21] Appl. No.: 119,162

[22] PCT Filed: Jan. 27, 1993

[86] PCT No.: PCT/JP93/00097

§ 371 Date: Sep. 23, 1993

§ 102(e) Date: Sep. 23, 1993

[87] PCT Pub. No.: WO93/14899

PCT Pub. Date: Aug. 5, 1993

[30] Foreign Application Priority Data

Jan. 31, 1992 [JP] Japan ................................ 4-16375

[51] Int. Cl.⁶ ............................ B23K 26/02; B23K 26/04
[52] U.S. Cl. ................ 219/121.79; 219/121.78; 219/121.83; 356/153; 356/399; 359/823
[58] Field of Search .................. 219/121.73, 121.74, 219/121.79, 121.78, 121.83; 350/171; 356/152, 247, 248, 153, 399, 400; 359/822, 823

[56] References Cited

U.S. PATENT DOCUMENTS 4,123,143  10/1978  Yachin et al. ..................... 350/171
4,468,119  8/1984   Hamar ............................... 356/152
4,566,202  1/1986   Hamar .
4,618,759  10/1986  Muller et al. ................ 219/121 LU
4,840,483  6/1989   Haffner ............................. 356/153
4,998,260  3/1991   Taniura .

FOREIGN PATENT DOCUMENTS 0154866  9/1985  European Pat. Off. .
0320573  6/1989  European Pat. Off. .
3-106586 5/1991  Japan .

Primary Examiner—Mark H. Paschall
Attorney, Agent, or Firm—Nikaido, Marmelstein, Murray & Oram

[57] ABSTRACT

A beam axis adjusting method of a laser robot including the steps of splitting a visible laser beam traveling along a laser beam pathway within the robot unit of the laser robot into a first laser beam traveling further along the laser beam pathway and a second laser beam traveling outside the robot unit, receiving the second laser beam by a target plate made of a semitransparent plate and mounted on the robot unit to form a light spot Sp on the front surface of the target plate, adjusting a relevant reflecting mirror unit disposed in the robot unit for the adjustment of the beam axis of the laser robot, and visually observing the light spot Sp from behind the back surface of the target plate while the relevant joint of the robot unit is in motion.

5 Claims, 3 Drawing Sheets

1

BEAM AXIS ADJUSTING METHOD FOR A LASER ROBOT

TECHNICAL FIELD

The present invention relates to a method of adjusting the center axis of the pathway of a laser beam (hereinafter referred to as "beam axis") in a laser robot to bring the beam axis into a coincident relationship with respective axes of motion of the joints of the laser robot. More particularly, it relates to a method of adjusting the beam axis of a laser robot, by employing a beam axis adjusting device provided with a semitransparent target plate which enables visual observation of a light spot cast on one surface thereof from behind the other surface thereof. The adjusting device is capable of being detachably mounted on the robot body of the laser robot for simple beam axis adjustment.

BACKGROUND ART

In an industrial laser robot having a robot unit, a laser beam emitted by an external laser generator is guided through a laser beam conduit to the laser beam inlet of the robot unit, and then the laser beam travels along a laser beam pathway formed within the robot unit to a laser beam projecting unit mounted on a robot wrist joined to the extremity of the robot unit. The laser beam projecting unit projects the laser beam on a workpiece under the control of a robot control unit for laser beam machining by the utilization of the energy of the laser beam, such as laser beam cutting, laser beam welding and laser beam deflashing.

In a laser robot of the above-described kind, it is essential to the use of the high energy of the laser beam for laser beam machining that the laser beam projected by the laser beam projecting unit is focused on a desired point on a workpiece. Accordingly, it is impossible to achieve exact laser beam machining unless the laser beam projected by the laser beam projecting unit is continuously focused on desired points on the workpiece during the continuous laser beam machining in which the joints of the laser robot are controlled for specified motions by a robot control unit according to a control program taught beforehand and stored in the robot control unit.

During the laser beam machining, the laser beam ducted through the external laser beam conduit to the robot unit is deflected by reflecting mirror units disposed on the respective axes of motion of the joints so as to travel along the laser beam pathway internally extending through the robot unit to the laser beam projecting unit disposed at the extremity of the robot unit. Accordingly, it is essential to focusing the laser beam projected by the laser beam projecting unit on the workpiece that the laser beam travels within the robot unit along the respective axes of motion of the joints. Namely, the beam axis of the laser beam must be in a coincident relationship with the respective axes of motion of the joints.

To this end, the beam axis of the laser beam of the laser robot must be adjusted in many stages of production thereof including a manufacturing stage and an assembly stage, before shipping of the laser robot from the factory, when installing the laser robot in a site of operation, when inspecting the laser robot for routine maintenance work and when transferring the laser robot from one place to another within the operation site.

When adjusting the beam axis of the laser robot, a visible, low-energy laser beam such as a ruby laser beam is used instead of the high-energy machining laser beam such as a carbon-dioxide gas laser beam.

A method of adjusting the beam axis of a laser robot and an apparatus for carrying out the same are disclosed in International Application No. PCT/JP91/101546.

The known method of adjusting the beam axis of a laser robot, using a visible laser beam, however, has a disadvantage that the method requires a comparatively expensive beam axis adjusting apparatus including photodetectors and the like, and comparatively difficult adjusting work.

DISCLOSURE OF THE INVENTION

Therefore, an object of the present invention is to facilitate beam axis adjusting work by enabling the visual recognition of the degree of coincidence of the axis of motion of a joint of a laser robot and the pathway of a laser beam within a robot mechanical unit of a laser robot.

Another object of the present invention is to provide a target type beam axis adjusting device capable of facilitating optically beam adjusting work for adjusting the optical axis of the laser robot, and provided with a semi-transparent target plate which enables visual observation of a light spot cast on one surface thereof from behind the other surface thereof.

A further object of the present invention is to provide a method of adjusting the beam axis of laser beam of the laser robot, capable of simply adjusting the beam axis of the laser robot by using the abovementioned target type beam axis adjusting device so that the beam axis is coincident with respective axes of motion of the joints of the robot unit of the laser robot, when the laser unit and the robot unit of the laser robot are connected after the laser robot has been shipped to and installed in an operation site thereof or after the laser robot has been transferred from one operation site to another operation site.

When adjusting the beam axis of a laser robot by the method in accordance with the present invention, the target type beam axis adjusting device having the semitransparent target plate which enables visual observation of a light spot cast on one surface thereof from behind the other surface thereof is mounted on the robot unit, for example, on the outer surface of the robot arm of the robot unit or the external surface of the robot wrist of the robot unit, a laser beam traveling along the laser beam pathway is split into two laser beams by a laser beam splitting means disposed in the laser beam pathway so that one of the two laser beams is focused on a light spot on the semitransparent target plate type beam axis adjusting device, the robot unit is moved on a joint thereof while observing the light spot cast on the transparent target plate, and the position of a mirror unit arranged on the axis of the joint is adjusted so that the light spot remains stationary on the transparent target plate irrespective of movement of the robot unit on the joint.

The present invention provides a method of adjusting the beam axis of a laser robot, in which adjustment of the beam axis of a laser beam traveling along a pathway extending within the robot unit via reflecting mirror units is performed so as to be in coincidence with axes of motion of respective joints of the laser robot, comprising the steps of:

splitting a laser beam traveling along a laser beam pathway in the robot unit of the laser robot at least at one specified position of the robot unit into a first laser beam traveling along the laser beam pathway and a second laser beam traveling toward outside the robot unit;

directing the second laser beam so as to be cast on a target plate including a semitransparent plate to thereby form a light spot capable of being observed from the backside of the target plate;

moving each of respective joints of the robot unit while inspecting a locus of a circular movement of the light spot on the target plate, and;

adjusting a position of at least a required one of the mirror units until the locus of the circular movement of the light spot contracts into an approximate point on the target plate.

When the laser robot of which the beam axis is adjusted at a first operation site for use by employing at least one target plate including the semitransparent plate is required to be moved from the first operation site to a different operation site, the beam axis adjusting device, i.e., the at least one target plate is not detached from the laser robot so as to maintain the adjusted condition of the beam axis. As a result, when the robot together with the beam axis adjusting device attached thereon is relocated at a different operation site, it is necessary to appropriately adjust only the introduction of the laser beam from the exterior into the robot unit so that the light spot is cast on the center of the target plate. Namely, cumbersome adjustment of positions of respective mirror units of the laser robot does not need to be carried out after the relocation of the laser robot.

BRIEF DESCRIPTION OF THE DRAWINGS

The above and other objects, features and advantages of the present invention will become apparent from the description of the preferred embodiment in conjunction with the accompanying drawings, wherein.

BEST MODE OF CARRYING OUT THE INVENTION

Figure 2:
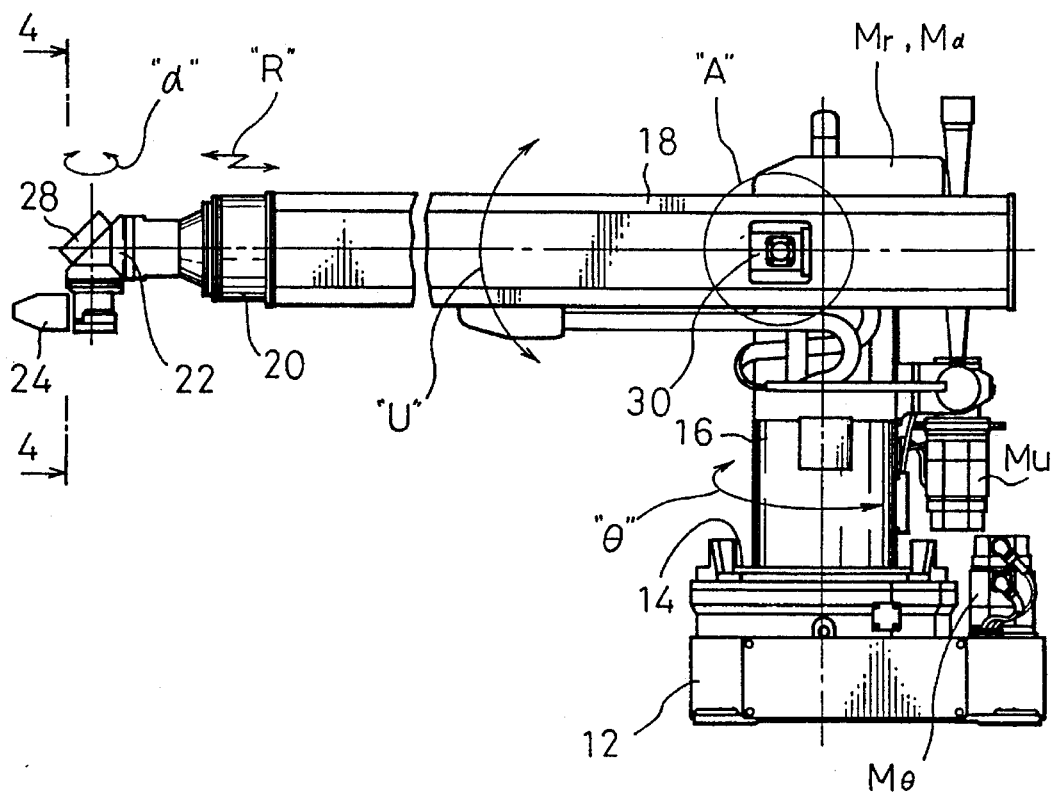
FIG. 2 is a front view of a robot unit of the laser robot, in which a beam axis adjusting device provided with a semitransparent target plate is attached to the side face of the robot unit.

FIG. 2 illustrates, by way of example, a robot unit provided for a laser robot to which a beam axis adjusting method in accordance with the present invention is applied.

The robot unit 10 of the laser robot is provided with a base 12, and movable robot components including a rotary table 14 mounted on the base 12, a robot body 16 set upright for θ-axis turning in directions indicated by the arrows about a vertical axis on the rotary table 14, an elongated first robot arm 18 pivotally joined for U-axis turning in a vertical plane in directions indicated by the arrows to the upper portion of the robot body 16, a second robot arm 20 projecting from the front end of the first robot arm 18 and supported for R-axis axial movement in directions indicated by the arrows, and a robot wrist 22 joined to the extremity of the second robot arm 20 for α-axis turning in directions indicated by the arrows.

The robot body 16 is driven for turning by a driving motor Mθ mounted on the base 12 through a transmission mechanism, such as a belt-and-pulley mechanism built into the base 12. The first robot arm 18 is driven for turning by a driving motor Mu mounted on the robot body 16 through a transmission mechanism, such as a ball-and-screw mechanism. The second robot arm 20 is driven for axial movement and the robot wrist is driven for turning respectively by driving motors Mr and Mα mounted on the rear portion of the first robot arm 18. Joint structures are formed respectively in the pivotal joint of the robot body 16 and the first robot arm 18, and in a portion of the robot wrist for an α-axis motion. A laser beam projecting unit 24 internally provided with a laser beam focusing means is attached to the extremity of the robot wrist 22.

A laser beam emitted by a laser generator is ducted through a laser beam conduit, not shown, so as to fall on the robot unit of the laser robot thus constructed from above or from below the same. In the laser robot shown in FIG. 2, the laser beam is introduced into the robot unit 10 through a laser beam inlet formed in the upper end of the robot body 16. The laser beam introduced into the robot unit 10 is deflected by a reflecting mirror unit disposed on the axis of the joint structure joining together the robot body 16 and the first robot arm 18, i.e., on the axis of the U-axis turning of the first robot arm 18 so as to travel through the first robot arm 18, the laser beam traveling through the first robot arm is deflected again by another reflecting mirror unit disposed within the first robot arm 18 so as to travel through a laser beam conduit extending through the first robot arm 18 and the second robot arm 20 toward the robot wrist 22.

In the robot wrist 22, the laser beam is deflected by a reflecting mirror unit 28 incorporated into the robot wrist 22 toward a focusing means such as a parabolic mirror, and then a laser beam projecting unit 24 projects the laser beam on a workpiece.

Accordingly, it is essential to exactly focus the laser beam projected by the laser beam projecting unit 24 on a desired position for laser beam machining using the high-energy beam while the laser robot is operated according to a control program stored in a robot controller, not shown, so that the laser beam pathway along which the laser beam travels coincides with the respective axes of the θ-axis turning of the robot body 16, the U-axis turning of the first robot arm 18 and the α-axis turning of the robot wrist 22. For this purpose, the laser beam pathway is adjusted when manufacturing the laser robot, before shipping the laser robot, when installing the laser robot in an operating site, after resetting the laser beam and when inspecting the laser robot for maintenance.

The present invention employs a beam axis adjusting device 30 including a semitransparent target plate, such as a translucent glass plate, for beam axis adjustment in combination with a laser beam splitter, not shown in FIG. 2, i.e., a beam splitter comprising a half-mirror to enable the operator to simply perform the beam axis adjustment.

A method of adjusting the beam axis of a laser robot which disposes the beam axis adjusting device 30 at a single position in the laser beam pathway in the robot unit, detects the misalignment of the beam axis with an axis of motion and adjusts the reflecting mirror unit so that the beam axis coincides with the axis of motion, is unable to detect a minute inclination of the beam axis relative to the axis of motion. Therefore, two beam axis adjusting devices 30 are disposed at two separate and spaced positions and the reflecting mirror units are adjusted for beam axis adjustment so that the beam axis coincides with the axes of motion at the two positions.

Accordingly, the two beam axis adjusting devices 30 are detachably attached to the robot unit respectively at a suitable position in the rear portion of the first robot arm 18 (a position indicated at "A") and a position at the extremity of the robot wrist 22 to carry out the beam axis adjustment. When attaching the beam axis adjusting device 30 to the robot wrist 22, the laser beam projecting unit 24 is detached temporarily from the robot wrist 22, and in turn the beam axis adjusting device 30 is attached to the robot wrist 22 instead of the laser beam projecting unit 24.

Figure 3:
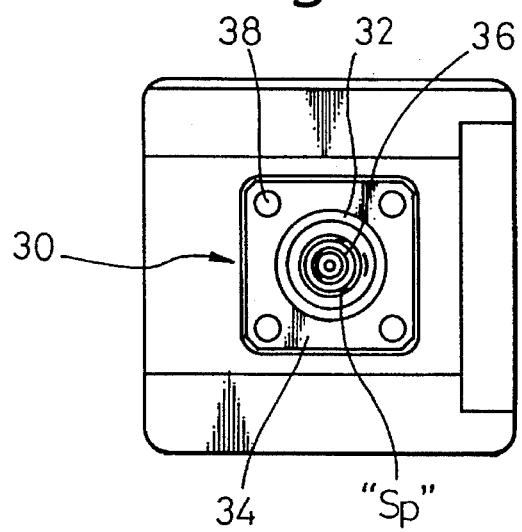
FIG. 3 is an enlarged fragmentary view of a portion A of FIG. 2 in which the beam axis adjusting device is attached to the robot unit.
Figure 4:
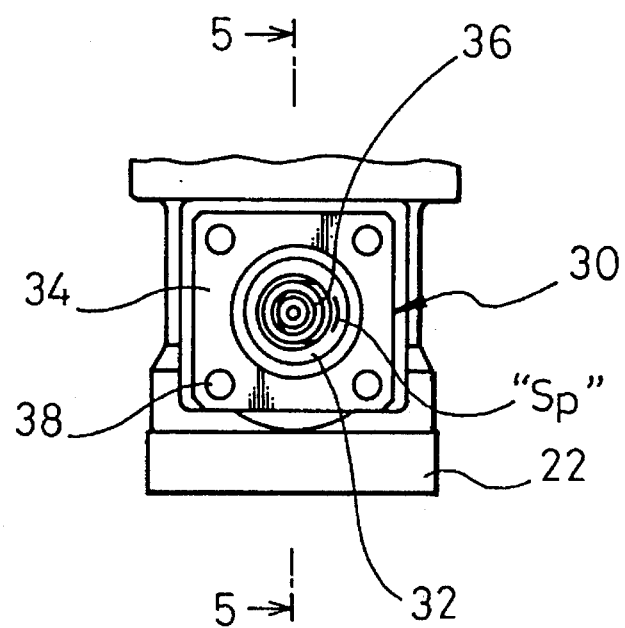
FIG. 4 is an enlarged fragmentary view of the beam axis adjusting device as detachably attached to a robot wrist, taken in the direction of the arrows along the line 4—4 of FIG. 2; and, FIG. 5 is a sectional view taken along the line 5—5 of FIG. 4.
Figure 5:
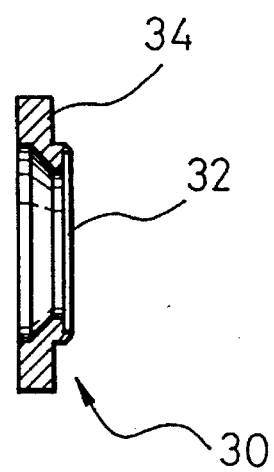

FIG. 3 illustrates the beam axis adjusting device 30 mounted on the first robot arm 18 in an enlarged view and FIG. 4 illustrates the beam axis adjusting device 30 attached to the extremity of the robot wrist 22. These two beam axis adjusting devices 30 are identical in construction and differ from each other in the size thereof. FIG. 5 is a sectional view, taken along the line 5—5 in FIG. 4.

The beam axis adjusting device 30 is provided with, as principal components, a semitransparent member, for example, a target plate 32 made of a translucent glass plate, and a frame 34 holding the target plate 32. The target plate 32 is provided with a plurality of concentric scale circles 36 depicted thereon. The frame 34 is made of a light metallic material, such as an aluminum material. Mounting holes 38 are formed in the peripheral area of the frame 34. Screws are inserted in the mounting holes 38 and screwed into the robot body to fasten the frame 34 to the robot body. Since the target plate 32 is semitransparent, a light spot formed on one surface thereof can be visually recognized from behind the outer surface of the target plate 32. The operator observes the light spot visually to detect the misalignment of the beam axis with the axis of motion during beam axis adjustment.

A beam axis adjusting method in accordance with the present invention will be described below with reference to FIGS. 1 and 2.

Figure 1:
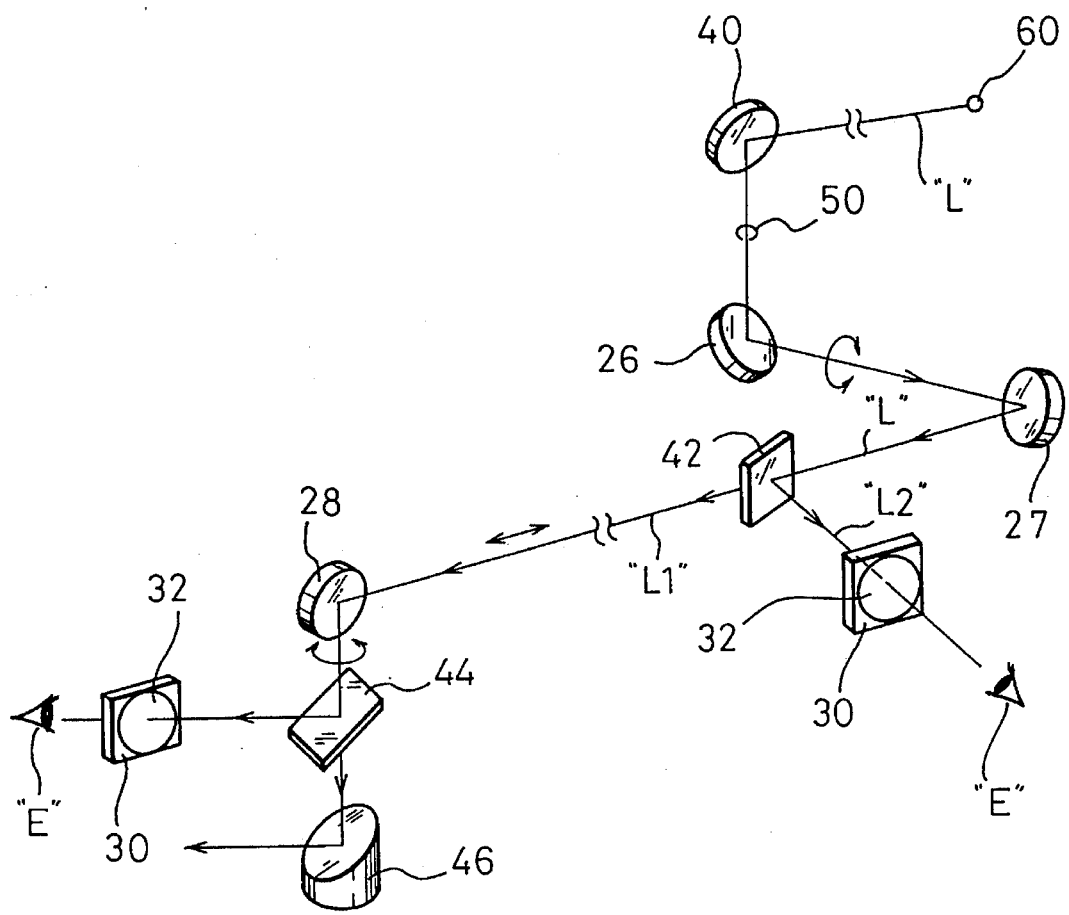
FIG. 1 is a diagrammatic view to be used for explaining a method of adjusting the beam axis of a laser robot according to an embodiment of the present invention.

Referring to FIGS. 1 and 2, a laser beam L is deflected by a reflecting mirror unit 40 arranged within a laser beam conduit extended outside the robot unit 10 so as to travel through the laser beam inlet 50 formed in the robot unit 10 (robot body 16) into the robot unit 10. Subsequently, the laser beam L is deflected by a reflecting mirror unit 26 disposed on the axis of turning of the first robot arm 18 at the joint pivotally joining together the robot body 16 and the first robot arm 18 so as to travel through the first robot arm 18 and the second robot arm 20. The laser beam L is then deflected by a reflecting mirror unit 28 disposed within the robot wrist 22 toward the focusing mirror 46, and further the laser beam L is projected on an object to be irradiated with the laser beam.

When adjusting the beam axis to align the center axis of the laser beam L and the axis of motion of the joint, a visible laser beam L emitted by a laser generator 60 is guided into the robot body, and half mirrors 42 and 44 serving as beam splitters are disposed respectively at two spaced-apart positions. The beam axis adjusting devices 30 each provided with the target plate 32 are detachably attached to the outer surface of the robot body at respective positions corresponding to the half mirrors 42 and 44.

The half mirror 42 (44) splits the visible laser beam L into a first laser beam L1 that penetrates the half mirror 42 (44) and travels straight and a second laser beam L2 deflected by the half mirror 42 (44). The second laser beam L2 falls on the target plate 32 of the beam axis adjusting device 30 in a light spot as indicated by a broken line Sp on the target plate 32 in FIGS. 3 and 4.

The light spot Sp formed by the visible laser beam on the irradiated front surface of the target plate 32 of the beam axis adjusting device 30 can be visually recognized by the operator E from behind the back surface of the target plate 32.

Thus, the light spot Sp is produced on the front surface of the target plate 32, and then the operator E turns the first robot arm 18 about the U-axis, while observing the light spot Sp. When the center axis of the visual laser beam is aligned with the axis of turning of the first robot arm 18, the light spot Sp remains stationary with its center in coincidence with the center of the target plate 32. When the center axis of the visible laser beam is misaligned with the axis of turning of the first robot arm 18, the light spot Sp moves along a circular locus on the target plate 32 as the first robot arm 18 is turned about the axis of turning.

Accordingly, when the light spot Sp moves along a circular locus on the target plate 32, the reflecting mirror units 26 and 27 are adjusted so that the light spot Sp contracts into a point-like spot on the target plate 32 even if the first robot arm 18 is turned about the axis of turning thereof.

When adjusting the beam axis by attaching the beam axis adjusting devices 30 respectively on the first robot arm 18 and the robot wrist 22, the beam axis adjusting device 30 on the first robot arm 18 is first used for the adjustment of the beam axis. Subsequently, the beam axis adjusting devices 30 on the robot wrist 22 is used for further fine adjustment of the beam axis by adjusting the reflecting mirror unit 28 arranged at the robot wrist 22. Namely, if it is observed that the light spot Sp formed in the target plate 32 of the beam axis adjusting device 30 attached to the robot wrist 22 moves along a circular locus in response to turning of the robot wrist 22 about the axis thereof, the reflecting mirror unit 28 is repeatedly adjusted to bring the beam axis into alignment with the axis of turning of the robot wrist 22.

Thus, the beam axis adjustment is completed when both the light spots Sp produced respectively on the target plates 32 of both the beam axis adjusting devices 30 become stationary with their center at the center of the corresponding target plates 32. The concentric scale circles 36 formed on the target plates 32 facilitate the visual recognition of degree of adjustment of the light spots Sp.

The beam axis adjusting method for a laser robot can be easily carried out by using a visible laser beam in the stage of manufacture of the laser robot, in the stage of shipping the laser robot, in the stage of installing the laser robot in an operating site and when moving the laser robot from one operating site to another.

Therefore, when, for example, moving the robot unit from a first operating site to a second site, the beam axis of the robot unit can be aligned with axes of turning of the laser robot simply by adjusting the beam axis of the robot unit by using the beam axis adjusting devices 30 provided with the target plate 32, respectively, before moving the robot unit from the first operating site, projecting a laser beam on the target plates 32 of the beam axis adjusting devices 30 to form light spots respectively on the target plates 32 after installing the robot unit in the second operating site, and adjusting the connection of the external laser beam conduit and the robot unit 10 so that the light spots are concentric with the scale circles of the target plates 32. Accordingly, the troublesome beam axis adjusting operation can be omitted.

Furthermore, when the beam axis is completely adjusted by using the beam axis adjusting devices 30 and a visible laser beam so that the light spots are formed on the target plates with their centers respectively at the centers of the target plates in the stage of shipping of the laser robot, and the laser robot having the beam axis adjusting devices 30 attached thereto are shipped, a beam axis adjusting operation can be achieved, without requiring the adjustment of the reflecting mirror unit 26 and the other reflecting mirror units, by installing the laser robot in an operating site, connecting the external laser beam conduit to the robot unit and adjusting the connection of the external laser beam conduit and the robot unit so that a laser beam ducted through the external laser beam conduit into the robot unit forms light spots concentric with the scale circles 36 on the target plates 32 of the beam axis adjusting devices 30.

As is apparent from the foregoing description, in accordance with the present invention, the beam axis of the laser robot along which a laser beam travels can be aligned with the axes of motion of the joints of a laser robot simply by using the simple beam axis adjusting devices provided with the target plates having semitransparent members. Furthermore, since the degree of adjustment of the beam axis can be recognized through the visual observation of the light spot produced on the target plate from behind the back surface of the target plate, the beam axis adjusting operation can be simplified.

Still further, when the beam axis of the laser robot is adjusted completely by using the beam axis adjusting devices in the stage of shipping of the laser robot, the beam axis adjustment can be achieved after installing the laser robot in an operating site simply by connecting an external laser beam conduit to the robot unit, forming light spots on the target plates of the beam axis adjusting devices and adjusting the connection of the external laser beam conduit and the robot unit so that the light spots are formed at the same positions as those at which light spots were formed when the beam axis was adjusted correctly before the shipment of the laser robot. Thus, the installation of the laser robot in the operating site, such as a workshop, can be quickly completed.

Similarly, when the beam axis of the laser robot is adjusted correctly before moving the laser robot from a first operating site to a second operating site, the beam axis can be correctly adjusted without repeating troublesome beam axis adjusting operation after installing the laser robot in the second operating site.

We claim:

1. A method of adjusting a beam axis of a laser robot, in which adjustment of the beam axis of a laser beam traveling along a pathway extending in a robot unit via reflecting mirror units is performed so as to be in coincidence with axes of motion of respective joints of said robot unit, comprising the steps of:

splitting a laser beam traveling along the pathway in said robot unit of said laser robot at at least one selected position of said robot unit, into a first laser beam traveling along the laser beam pathway and a second laser beam traveling toward an outside of said robot unit;

directing said second laser beam so as to be cast on a detachably attached target plate made of a semitransparent flat plate to form a light spot to be observed from backside of said detachably attached target plate;

moving each respective joint of said robot unit while inspecting a locus of a circular movement of said light spot on said detachably attached target plate; and adjusting a position of at least one of said mirror units until said locus of said circular movement of said light spot contracts into an approximate point on said detachably attached target plate.

2. A method of adjusting the beam axis of a laser robot according to claim 1, wherein said splitting of said laser beam is performed at two predetermined separate positions along said laser beam pathway of said robot unit, and wherein said two predetermined positions at which said splitting of said laser beam is performed, are respectively disposed at an upper position on said laser beam pathway near a laser beam inlet of said robot unit and at a lower position on said laser beam pathway near a laser beam outlet through which said laser beam is projected outside said robot unit.

3. A method of adjusting the beam axis of a laser robot according to claim 1, wherein:

said target plate made of said semitransparent flat plate has a front surface on which said second laser beam is cast, said front surface being provided with a plurality of concentric scale circles, and wherein each of said reflecting mirror units is adjusted so that said light spot remains stationary within the smallest scale circle among said plurality of concentric scale circles.

4. A method of adjusting the beam axis of a laser robot according to claim 1, wherein the target plate made of said semitransparent flat plate and detachably attached to said robot unit is held on a frame member and formed as a beam axis adjusting device, and wherein said frame holding said target plate is detachably attached to said robot unit.

5. A method of adjusting the beam axis of a laser robot according to claim 4, wherein said frame member is made of an aluminum material and provided with a plurality of mounting holes formed therein.

* * * * *

UNITED STATES PATENT AND TRADEMARK OFFICE
CERTIFICATE OF CORRECTION

PATENT NO. : 5,484,982
DATED : January 16, 1996
INVENTOR(S) : Nihei et al.

It is certified that error appears in the above-indentified patent and that said Letters Patent is hereby corrected as shown below:

Title page,

Item: [86] line 2 and 3 please delete "September 23, 1993" and insert therefor --September 24, 1993--.

Signed and Sealed this

Eighteenth Day of June, 1996

BRUCE LEHMAN

*Attest:*

*Attesting Officer*     *Commissioner of Patents and Trademarks*